(12) United States Patent
Harriman et al.

(10) Patent No.: US 6,666,375 B1
(45) Date of Patent: Dec. 23, 2003

(54) ROTARY ENCODERS

(75) Inventors: Douglas L. Harriman, Portland, OR (US); David F. D. Buck, Ridgefield, WA (US); Donald G. Walker, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/543,600

(22) Filed: Apr. 5, 2000

(51) Int. Cl.[7] .................................................. G06K 7/14
(52) U.S. Cl. ........................................ 235/454; 235/375
(58) Field of Search ................................ 235/380, 375, 235/462.13, 454; 341/11, 13; 250/231.14, 231.17

(56) References Cited

U.S. PATENT DOCUMENTS

| | | | |
|---|---|---|---|
| 4,734,868 A | 3/1988 | DeLacy | |
| 5,070,268 A | * 12/1991 | Phelon et al. | 310/153 |
| 5,411,340 A | 5/1995 | Elgee | |
| 5,451,776 A | * 9/1995 | Kolloff et al. | 250/231.18 |
| 5,598,201 A | 1/1997 | Stodder et al. | |
| 5,774,074 A | 6/1998 | Cooper et al. | |
| 5,929,789 A | 7/1999 | Barbehenn | |
| 6,017,114 A | 1/2000 | Elgee et al. | |

* cited by examiner

Primary Examiner—Karl D. Frech

(57) ABSTRACT

A unitary, rotary encoder disk provides low cost, ease of manufacture, and resolution capability exceeding through hole encoders and, in one embodiment, equivalent to that achieve in thin film technologies. The unitary construct is molded as a transparent polymer disk, with integrated mounting features. Either molded disk surface features or laser burning is used to facilitate the position graduation mark forming process.

8 Claims, 3 Drawing Sheets

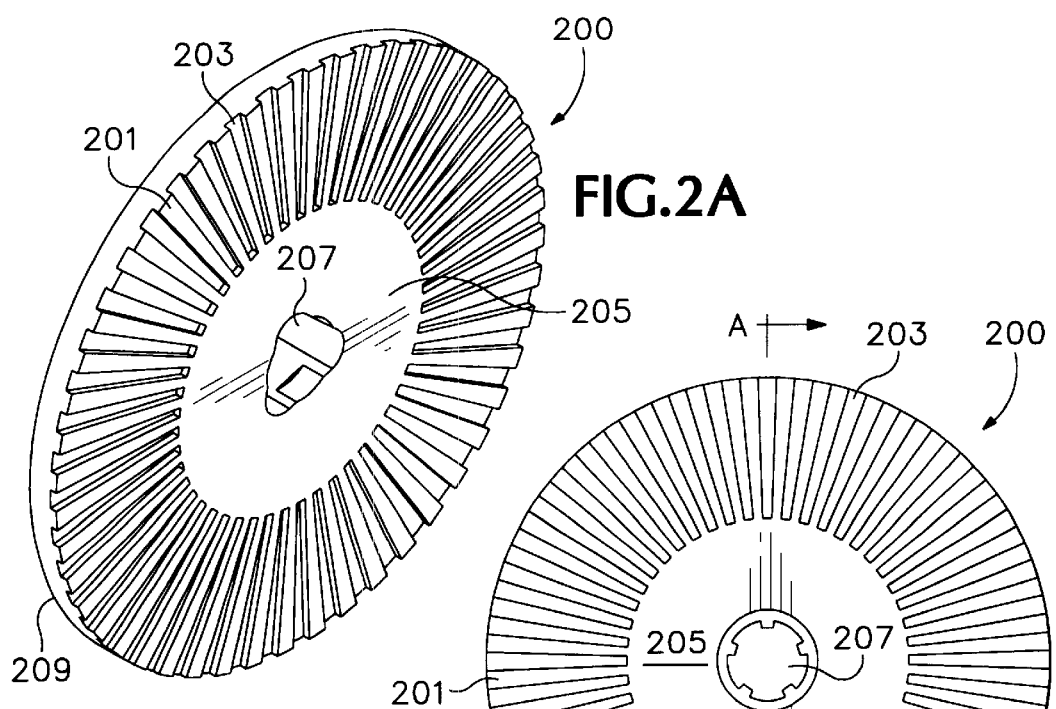
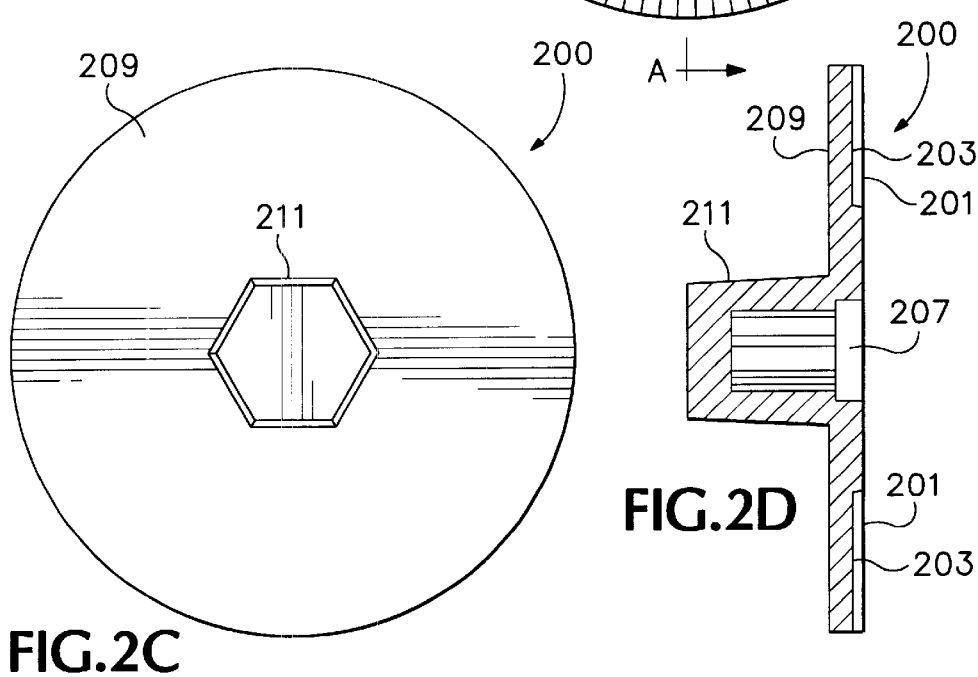

ROTARY ENCODERS

BACKGROUND OF THE INVENTION

1. Field of the Invention

The present invention relates generally to position-encoding devices (generally abbreviated "encoders"), particularly rotary encoders (also sometimes referred to as "code wheels"). Even more specifically, the present invention provides rotary encoder devices useful for ink-jet hard copy apparatus where accurate positioning of motor driven subsystems, such as pen servicing elements and transports for accurately advancing the printing medium through a printing-zone, is required.

2. Description of Related Art

An encoder generally has two main elements that are subject to relative movement. One of the elements is extended along the direction of relative movement that is to be measured and has marked graduations that are, in effect, arrayed along that direction of movement. The other element is positioned to sense relative passage of such graduations and in response to produce a signal indicative of the movement and which can be translated into a position reckoning. Both linear and rotary encoders are known in the art. "Resolution" is the ability of the system to properly and reliably distinguish each graduation from adjacent ones. This ability may also be described as the readability of the graduations through interpretation of the signals transmitted, or the precision with which the signals correspond to the passage of graduations passed the sensing element. A typical encoder subsystem comprises a optical detector device (reflective or transmissive) mounted in conjunction with a graduated encoder disk acting as a light interrupter to generate signals indicative of the relative position.

Ink-jet printers create text and images as arrays of a very large number of computer-controlled placements of individual, minute, ink droplets on a printing medium that is computer-control advanced in very small steps through the printer during the ink deposition process. Encoders are used to determine positioning of print media relative to the ink jet writing instrument. Other subsystems of an ink-jet printer, such as the positioning of movable service station elements, can employ relatively low resolution encoders directly mounted to a DC drive motor.

For example, rotary encoders can be used to establish image positioning on a print medium as shown in FIG. 1 (Prior Art) herein from U.S. Pat. No. 5,598,201 filed on Jan. 31, 1994, and by Stodder et al. for a DUAL-RESOLUTION ENCODING SYSTEM FOR HIGH CYCLIC ACCURACY OF PRINT-MEDIUM ADVANCE IN AN INKJET PRINTER (issued Jan. 28, 1997, assigned to the common assignee and incorporated by reference herein).

Referring to FIG. 1 (Prior Art), two rotary encoders 41, 51 are linked through a gear train 21. The gear train 21 consists of a spur 22 on a shaft 12 of the print-medium drive platen/roller 11, and a pinion 23 that engages the spur 22 and rides on a shaft of a motor 31. The motor 31, train 21 and roller 11 together advance 13 a piece of printing medium 1 longitudinally relative to a printhead, or pen 71. The pen 71 is mounted for transverse motion 72 to mark on the medium 1 at coordinate positions established orthogonally by the medium advance 13 and pen motion 72. Each encoder 41, 51 includes a respective encoder disk 42, 52 and encoder sensor 43, 53. One encoder disk 42 is on the platen shaft 12 and the other disk 52 is on the motor shaft 32. Accordingly, the encoder disk 52 has a mechanical advantage relative to the platen 11. In operation, encoder signals 44, 54 from respective encoders 41, 51 are transmitted to digital electronic controller for 61 for processing which in turn provide signals 62 to control the platen 11 motion and pen 71 motion 72. Relatively low resolution disks 42, 52 can be employed by use of quadrature signal generation and digital signal processing techniques.

Commercially available products such as the Hewlett-Packard™ DeskJet™ models 720 and 722C incorporate an optical encoder wheel on the axle of the print media advance tires. Note that in addition to the illustrated mechanical type paper transport subsystem, endless-loop, vacuum belt, print media transports are also employed in ink-jet printers for moving the media through a printing-zone; the belt position in the printing zone at a given time relative to a printhead is critical to image formation. It will also be recognized by those skilled in the art that document scanners and other hard copy apparatus such as facsimile machines that may incorporate scanning subsystems may use the same type media advance system as a simple computer printer. The present invention may be employed in such other types of hard copy apparatus where incremental advance of the media must be coordinated with other subsystems.

In printers, the accuracy of position determinations along the advance direction of the medium is limited by the positional accuracy of the encoder system graduations. In fact, in printing with a digitally manipulated matrix of very small droplets of ink, for example at a resolution of 1200 dots-per-inch or greater, precision in alignment of the print media with the printhead is a key factor of resultant print quality.

In general, opaque disks used for encoders are preferably made of metal, providing sturdiness of construction, punched through with light transmitting slits. Metal encoder disks are relatively expensive. Moreover, metal type encoder disks are inherently a low resolution mechanism as punching processes attempting to form high resolution graduations can bend or deform the material. Chemical etching or precision laser cutting of the slits are relatively expensive manufacturing techniques.

In other known rotary encoders, a printed film technology is employed. Printed films can achieve very precise encoder lines through photolithographic processes performed on a thin plastic film. Thus, relatively high resolution position encoding can be achieved. However, these films employed are generally too thin to attach directly to a rotating shaft. Therefore, a separate piece part for a hub and attachment manufacturing step is required. Thus, this is a moderately expensive solution.

Moreover, the printed graduation marks can be scratched from stamped plastic, and to a lesser extent on films, leading to encoder subsystem failures.

Heavier plastic disks with molded through holes are difficult to achieve due to the precise mating of mold halves required to achieve holes without flash. Moreover it is difficult to push material in to fill apertures where desired. Thus, through hole type encoders are capable of only relatively low resolution.

Generally, it is also known in the art to provide relatively thick, transparent material, encoder disks with graduation marks using silk screening or photochemistry. The known processes for simply printing a pattern on an inflexible surface also has problems. Pad printing of lines results in varying line thicknesses depending on ink quantity and pressure; controlling run-out (the abbreviation for tolerance problems known to occur in rotating disk technologies)

presents difficulties for printing alignment; smudging and voids can occur, reducing the process yield. Hot stamping, or coated foil transfer, using a heated die in the shape of the desired graduation marks, presents the same issues; moreover, ink bridging the small gap between marks can occur.

Therefore, there is a need for providing a relatively low cost encoder having equivalent resolution capabilities to that provided by the prior art.

For convenience in describing the art and the present invention, all types of ink-jet hard copy apparatus are sometimes hereinafter referred to as "printers;" all types, sizes, and compositions of print media are also referred to as "paper;" all compositions of colorants are sometimes referred to as "ink;" and all embodiments of an ink-jet writing instruments are simply referred to as a "pen;" no limitation on the scope of the invention is intended nor should any be implied.

SUMMARY OF THE INVENTION

In its basic aspects, the present invention provides an encoder disk including: a molded, unitary polymer construct having a disk portion with alternating, uniform, radial ridges and valleys on a first disk surface, wherein the ridges form position encoding graduations.

In another basic aspect, the present invention provides a method for forming encoder disks, including the steps of: molding a unitary body, polymer disk, and molding one surface with a circumference defined by a series of radially extending, alternating, ridges and valleys.

In another basic aspect, the present invention provides a paper position detecting device for an ink-jet printer having a paper transport mechanism, the detecting device including a light detector mechanism, including: coupled to the paper transport mechanism, a rotary encoder disk including a unitary, polymer construct having a disk portion with alternating, uniform, radial ridges and valleys on a first disk surface, an aperture defining a rotational axis of the disk, and on a second surface of the disk, a shaft attachment portion, axially coincident with the aperture, for receiving a complementary member of the paper transport mechanism, wherein the ridges are reactive to transmitted light from the light detector mechanism, forming position graduations related to print media positions established by the paper transport mechanism.

Some of the advantage of the present invention are:
it provides a low cost, high reliability, solutions to problems inherent in equivalent resolution, prior art, encoders;
it has a lower cost than printed film encoder types;
it is a unitary piece part, lower manufacturing costs and device complexity;
it reduces manufacturing tool and complexity requirements;
it is resistant to handling damage;
it can be directly mounted to a rotating shaft;
in a second embodiment described hereinafter, high resolution rotary encoder—comparable to prior art thin film resolution—is achieved in a low cost, unitary construct capable of direct mounting to a shaft;
in the second embodiment described hereinafter, it provides an encoder disk having higher resolution than through hole encoder types; and
in the second embodiment described hereinafter, it provides a versatile graduation marking capability. it reduces run-out problems;

The foregoing summary and list of advantages is not intended by the inventors to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

FIGS. 2A through 2D illustrate an encoder disk in accordance with the present invention in which:

FIG. 2A is a perspective view,

FIG. 2B is a front view,

FIG. 2C is a back view, and

FIG. 2D is a cross-section taken in plane A—A of FIG. 2B.

FIG. 3A and 3B illustrate an alternative embodiment encoder disk in accordance with the present invention in which:

FIG. 3A depicts a blank encoder disk front surface, and

FIG. 3B depicts a laser-scribed graduation encoder disk front surface as shown in FIG. 3A.

Figure 1:
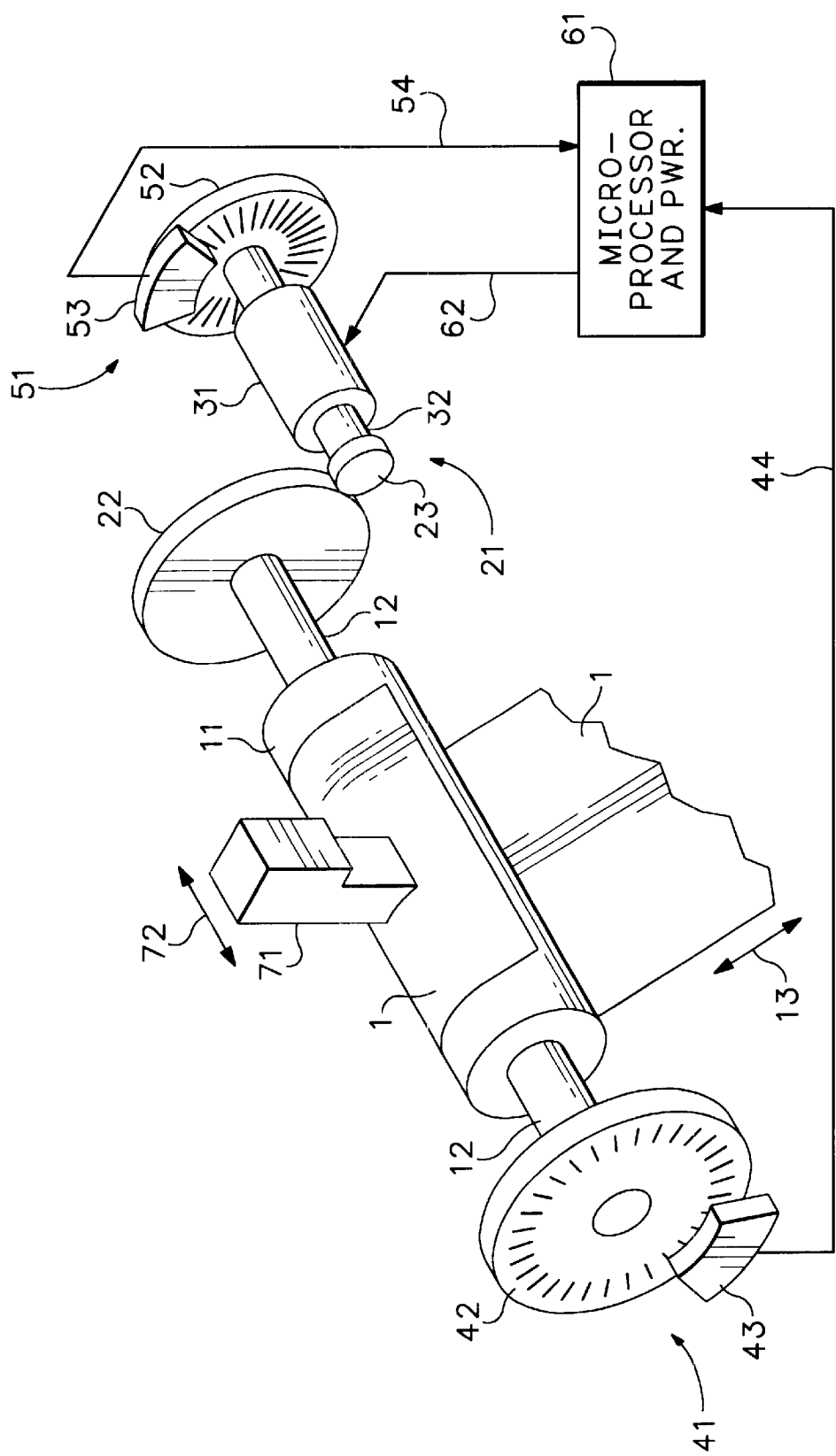
FIG. 1 (Prior Art) is a schematic illustration in perspective view of an ink-jet printing system employing disk encoder subsystems.

The drawings referred to in this specification should be understood as not being drawn to scale except if specifically annotated.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

As shown in FIGS. 2A–2D, an encoder disk 200 is formed as a single piece, molded, construct. A unitary part, encoder disk 200 is molded from a light-transmissive polymer, negating the need for through holes as encoding graduations. Polymers such as polycarbonate, acrylic, PET, or ABS may be employed. For particular implementations where the disk is to be press-fit onto a shaft, a relatively ductile material such as polycarbonate or ABS is preferred over a relatively brittle material such as acrylic. Polycarbonate may provide better optical clarity than ABS.

The manufacturing mold (not shown) is provided in a known manner with features that form a series of uniform, radial ridges 201 and valleys 203 on the encoding surface 205; the valleys do not reach the other half of the mold. In other words, because the valleys do not contact the other half of the mold, mold construction and the molding process is simplified. The elimination of through holes and the complex mating features required in such mold halves reduces tooling complexity and cost. This also means that the radiating ridges 201 formed between valleys 203 can be fabricated to a tighter tolerance. In practice, it is estimated that ridge 201 and valley 203 cross-width dimensions at or near the circumference of the disk surface where sensor readings will be taken, of approximately 0.25 millimeter (mm) can be achieved.

A central aperture 207 defining the axis of rotation of the encoder disk 200 is provided for mounting the disk onto a shaft (not shown) from a motor or a gear train (see e.g., FIG. 1). The aperture 207 can be provided with press-fit features for receiving a shaft into a fixed, axial, orientation. FIGS. 2C and 2D illustrate that the back side, or surface, 209 of the encoder disk incorporates a shaft attachment feature 211 as appropriate to a specific implementation; the shown embodiment being for direct mounting to a DC motor shaft (not shown).

To provide graduation marks necessary to block the passage of light, the ridges 201 are printed with opaque ink. Hot stamping with a flat, heated die onto the surface 205 leaves ink only on the ridges and on any flat surface region 205 left about the central aperture 207. When a coated ink-foil (not shown), inking roller, or other known manner ink applicator is applied to surface 205, the contact to the ridges 201 deposits the ink in a precise manner determined by the molded features. It has been determined that graduation ridges 201 spaced less than 0.25 mm apart may tend to collect ink in the valleys 203 or to retain bridges of ink across the valleys. However, exact space of the graduations can be determined empirically in accordance with the need of the specific implementation and the materials employed in fabricating the encoder device. It will also be recognized by those skilled in the art that the ridges may be printed alternatively with a reflective coating for use with a reflective type optical sensor device.

The dimensions of the disk will depend on a particular specific implementation, depending on design factors such as maximum allowable run-out limits, different optical sensor operating specifications, different levels of accuracy tolerance, and the like. Plastic gate location can be important in determining the optical clarity of the disk. Depending on part thickness and the parameters of the materials employed in molding, the size of the part could be limited by the ability to fill a part through a single gate to avoid knit lines which could refract light and cause resolution problems.

Depending on the sensor technology, it is possible to use an unmarked raised-ridge embodiment. This is possible as long as there is significant difference in the transmittance of light through between the ridges and the valleys. The mold parts can be stressed to change the transmissive difference between the valley and an adjacent ridge.

Figure 3A:
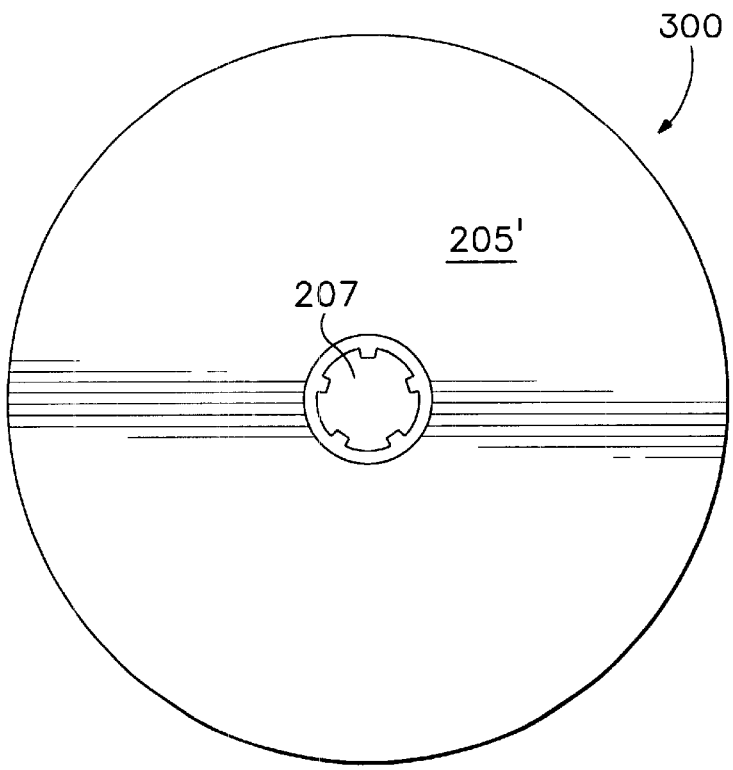
Figure 3B:
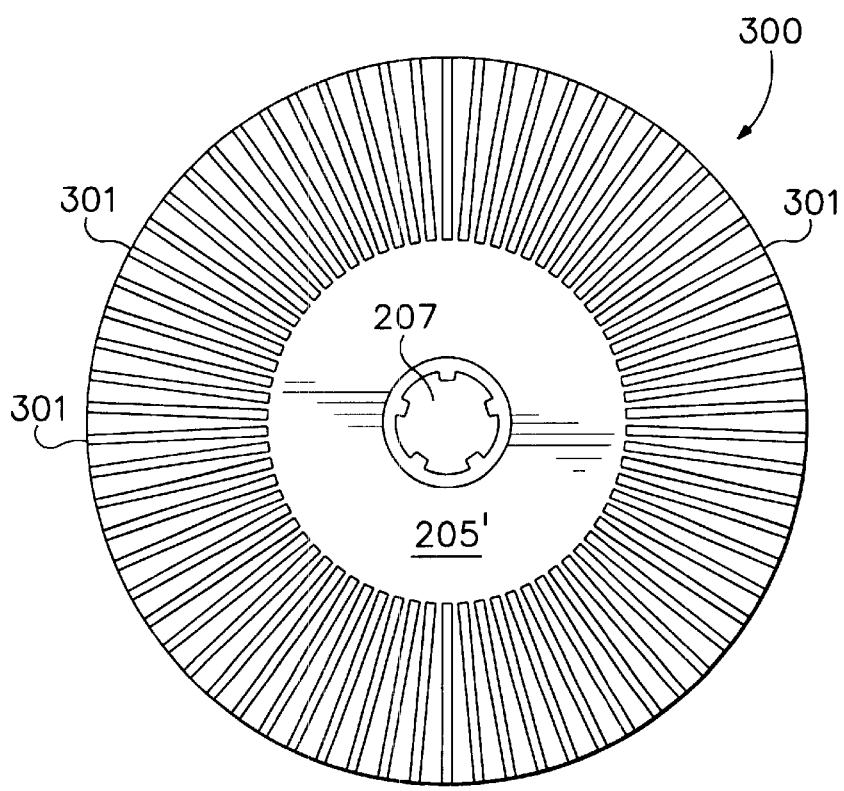

FIGS. 3A and 3B illustrate a second embodiment of the present invention, providing a higher resolution rotary encoder 300. As with the embodiment depicted in FIGS. 2A–2D, a unitary construct molded of a transparent polymer is formed. However, as shown in FIG. 3A, the front surface 205' in this embodiment is substantially planar prior to adding encoding graduations.

Prior to molding, an additive is mixed into the polymer to form a substantially homogenous compound. The additive is selected such that when the molded part is subjected to a focused laser light beam, the laser will discolor the compound. Such laser burning is performed in a known manner to precisely form radiating graduation markings 301 (FIG. 3B). Note that the opaque radiating graduations 301 can be embedded beneath the surface to make the encoder extremely scratch resistant.

In a practical application, a polycarbonate polymer having a thermochemical additive—that is, one which will undergo a thermochemical reaction when excited by laser light—commercially available from M.A. Hanna Company, added in approximately one part concentrate per twenty five parts resin can be burned with a neodymium:yittriumaluminum-garnet (Nd:YAG) laser light (wavelength =1064 nm). Other lasers, such as TEA, CO2, or EXCIMER known in the art may also be employed. It has been found that graduation markings of as small as approximately 0.1 mm can be achieved. As will be recognized by those skilled in the art, other formulations and laser processing parameters can be employed within the scope of the present invention. It should also be recognized that different graduation patterns from the illustrated radiating lines can be achieved by programming the laser tool. Moreover, computer-controlled laser marking systems can provide quick changes, such as to line density, line thickness, and the like, during development stages and commercial model changes.

Thus, in either embodiment described above, the present invention provides a low cost, rotary encoder of increased resolution over through hole or thick body printed types.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . "

What is claimed is:

1. An encoder disk comprising:
   a molded, unitary, substantially transparent polymer construct having a disk portion with alternating, uniform, radial ridges and valleys on a first disk surface, wherein the ridges form position-encoding graduations configured to be selectively coated with a non-transparent material and optically read to indicate rotational position of the disk portion.

2. The encoder disk as set forth in claim 1, further comprising:
   an aperture defining a rotational axis of the disk.

3. The encoder disk as set forth in claim 2, further comprising:
   on a second surface of the disk portion, a shaft attachment portion axially coincident with the aperture.

4. The encoder disk as set forth in claim 1, wherein the substantially transparent polymer is selected from a group including polycarbonate, acrylic, PET, and ABS.

5. The encoder disk as set forth in claim 1, wherein the ridges are light-absorptive and the valleys are light-transmissive.

6. The encoder disk as set forth in claim 1, wherein the ridges are light-reflective and the valleys are light-transmissive.

7. A method for forming encoder disks, comprising:

molding a unitary body, polymer disk, molding one surface with a circumference defined by a series of radially extending, alternating, ridges and valleys, and stamping the one surface to coat only the ridges with a material which renders the ridges differentially reactive to transmitted light than the valleys, thereby defining position-encoding markings on the disk.

8. A paper position detecting device for an ink-jet printer having a paper transport mechanism, the detecting device including a light detector mechanism, comprising:

coupled to the paper transport mechanism, a rotary encoder disk including a unitary, substantially transparent, molded polymer construct having a disk portion with alternating, uniform, radial ridges and valleys on a first disk surface, an aperture defining a rotational axis of the disk, and on a second surface of the disk, a shaft attachment portion, axially coincident with the aperture, for receiving a complementary member of the paper transport mechanism, wherein the ridges are printed with opague ink to be differently reactive to transmitted light from the light detector mechanism than are the valleys, the ridges and valleys thus forming position graduations related to print media positions established by the paper transport mechanism; and uncoupled from the paper transport mechanism, a sensor configured to detect transmitted light from the light detector mechanism upon reaction of such transmitted light with the ridges and valleys.

* * * * *